(12) United States Patent
Watanabe et al.

(10) Patent No.: US 7,119,163 B2
(45) Date of Patent: Oct. 10, 2006

(54) PROCESS FOR CONTINUOUSLY PRODUCING ε-CAPROLACTONE POLYMER

(75) Inventors: Jun Watanabe, Ohtake (JP); Shigeyuki Yoshida, Ohtake (JP)

(73) Assignee: Daicel Chemical Industries, Ltd., Sakai (JP)

( * ) Notice: Subject to any disclaimer, the term of this patent is extended or adjusted under 35 U.S.C. 154(b) by 111 days.

(21) Appl. No.: 10/500,246

(22) PCT Filed: Oct. 31, 2002

(86) PCT No.: PCT/JP02/11381

§ 371 (c)(1),
(2), (4) Date: Jun. 25, 2004

(87) PCT Pub. No.: WO03/057757

PCT Pub. Date: Jul. 17, 2003

(65) Prior Publication Data

US 2005/0014923 A1 Jan. 20, 2005

(30) Foreign Application Priority Data

Dec. 28, 2001 (JP) ............................. 2001-400185

(51) Int. Cl.
*C08G 63/08* (2006.01)
*C08G 69/08* (2006.01)
*C08G 6/00* (2006.01)

(52) U.S. Cl. ...................... 528/480; 528/486; 528/499; 528/502; 528/354; 528/359; 528/310

(58) Field of Classification Search ................ 528/354, 528/359, 480, 486, 502, 499
See application file for complete search history.

(56) References Cited

U.S. PATENT DOCUMENTS

| | | | | | |
|---|---|---|---|---|---|
| 3,767,627 A | * | 10/1973 | Lowhardt | ..................... | 525/411 |
| 3,806,495 A | * | 4/1974 | Lowhardt | ..................... | 525/415 |
| 5,496,923 A | * | 3/1996 | Suizu et al. | ................. | 528/501 |
| 5,889,127 A | | 3/1999 | Yamada et al. | | |

FOREIGN PATENT DOCUMENTS

| | | |
|---|---|---|
| EP | 0 425 708 A | 5/1991 |
| EP | 0 644 219 A | 3/1995 |
| EP | 0916684 A2 | 5/1999 |
| JP | 10-195186 A | 7/1998 |

\* cited by examiner

*Primary Examiner*—P. Hampton Hightower
(74) *Attorney, Agent, or Firm*—Birch, Stewart, Kolasch & Birch, LLP

(57) ABSTRACT

A process for the continuous production of an ε-caprolactone polymer characterized by including heating an ε-caprolactone under reduced pressure or in an inert gas stream to volatilize the unreacted ε-caprolactone from the polymer and cooling the vapor phase part containing the matter volatilized to thereby recover the unreacted ε-caprolactone, wherein the amount of the ε-caprolactone to be recovered is regulated to larger than 5 times by weight the amount of caprolactone dimer.

8 Claims, 1 Drawing Sheet

PROCESS FOR CONTINUOUSLY PRODUCING ε-CAPROLACTONE POLYMER

TECHNICAL FIELD

The present invention relates to a process for a continuous production of an ε-caprolactone polymer. More specifically, the present invention relates to a process for a continuous production of an ε-caprolactone polymer which includes heating an ε-caprolactone polymer under reduced pressure or in an inert gas stream to continuously remove and recover unreacted ε-caprolactone.

BACKGROUND ART

ε-Caprolactone is heated with an initiator having an active hydrogen such as a hydroxyl group in the presence of a catalyst to allow ring-opening polymerization. Although aliphatic polyesters are generally considered to have difficulty in having a higher molecular weight, ε-caprolactone is polymerized to easily prepare an aliphatic polyester having a high molecular weight. Therefore, ε-caprolactone is used as materials for many polyesters. However, the reaction rate depends on the concentration of ε-caprolactone and depolymerization causing ε-caprolactone regeneration occurs at a high temperature, so that it has a limitation to decrease the concentration of ε-caprolactone by a reaction. In particular, with respect to a copolymer with a polymer having a high melting point, the reaction temperature should be maintained at a high temperature, so that the influence of depolymerization cannot be ignored.

For a polymer obtained by a reaction of a polymer having a hydroxyl group and/or an ester bond and a cyclic ester containing ε-caprolactone, processes for producing polyester block copolymers each obtained by a ring-opening polymerization of a crystalline aromatic polyester and a lactone are described in patent publications such as JP 48-4116 B, JP 52-49037 B, JP 8-9661 B, JP 7-76263 B, and JP 3-263425 A.

Of those, the publications of JP 52-49037 B, JP 8-9661 B, JP 7-76263 B, and JP3-263425 A disclose processes for removing monomers at temperatures equal to or higher than melting points under reduced pressure as processes for removing remaining monomers. Although all of the processes include treating a melt under reduced pressure, those publications show no specific process for recovering ε-caprolactone. Actually, those processes are insufficient when being performed continuously for a long period of time.

On the other hand, each publication of JP 60-31525 A or JP 5-23290 B describes a process for producing a polymer in which a polyester-based block copolymer obtained by a ring-opening polymerization of a crystalline aromatic polyester and a lactone is further polymerized in a solid-phase state at a temperature of 170 to 215° C. and below the melting point so as to have a higher molecular weight. Although both processes include heating treatments under vacuum or in a gas stream, those publications describe no process for recovering ε-caprolactone to be removed.

An object of the present invention is to provide a process for recovering ε-caprolactone, which is contained in an ε-caprolactone polymer and causes a trouble in industrial production of an ε-caprolactone polymer, to a process for producing an ε-caprolactone so as to enable continuous operations.

To attain the aforementioned object, the inventors of the present invention have made extensive studies. As a result, the inventors have found out that ε-caprolactone remaining in a polymer can decrease by specifying the weight ratio of ε-caprolactone to be recovered relative to caprolactone dimer, and the present invention has been accomplished.

DISCLOSURE OF THE INVENTION

That is, according to a first aspect of the present invention, there is provided a process for a continuous production of an ε-caprolactone polymer, characterized by including: heating an ε-caprolactone polymer under reduced pressure or in an inert gas stream to volatilize unreacted ε-caprolactone from the polymer; and cooling a vapor phase part containing a matter volatilized to thereby recover the unreacted ε-caprolactone, in which the amount of ε-caprolactone to be recovered is regulated to larger than 5 times by weight relative to the amount of caprolactone dimer.

According to a second aspect of the present invention, there is provided a process for a continuous production of an ε-caprolactone polymer according to the first aspect of the present invention, in which the amount of ε-caprolactone to be recovered is regulated to equal to or larger than 10 times by weight relative to the amount of caprolactone dimer.

According to a third aspect of the present invention, there is provided a process for a continuous production of an ε-caprolactone polymer according to the first or second aspect of the present invention, in which the step of cooling the vapor phase part to recover unreacted ε-caprolactone includes a recovering step in which the temperature is regulated within 20 to 65° C. and an optional recovering step in which the temperature is regulated within −2 to 30° C.

According to a fourth aspect of the present invention, there is provided a process for a continuous production of an ε-caprolactone polymer according to any one of the first to third aspects of the present invention, in which the ε-caprolactone polymer is a copolymer of a polymer having a hydroxyl group and/or an ester bond and ε-caprolactone.

According to a fifth aspect of the present invention, there is provided a process for a continuous production of an ε-caprolactone polymer according to the fourth aspect of the present invention, in which the polymer having a hydroxyl group and/or an ester bond is a polyester.

According to a sixth aspect of the present invention, there is provided a process for a continuous production of an ε-caprolactone polymer according to any one of the first to fifth aspects of the present invention, characterized by further including a ring-opening polymerization step of ε-caprolactone as a preceding step.

According to seventh aspect of the present invention, there is provided a process for a continuous production of an ε-caprolactone polymer, characterized by including: a polymerization step for performing a ring-opening polymerization of ε-caprolactone singly or with other compound; a monomer-removing step which includes heating an ε-caprolactone polymer under reduced pressure or in an inert gas stream in a treatment apparatus (1) to volatilize a matter to be volatilized containing ε-caprolactone and caprolactone dimer from the polymer; and a recovering step which includes cooling a vapor phase part containing a matter volatilized in a recovering apparatus (3) to recover ε-caprolactone as a liquid, in which: (i) the cooling temperature is regulated; (ii) the polymerization condition is regulated; and/or (iii) ε-caprolactone is added to the treatment apparatus (1) and/or the recovering apparatus (3) so that the amount of ε-caprolactone to be recovered is regulated to larger than 5 times by weight relative to the amount of caprolactone dimer to prevent clogging in the recovering step.

According to an eighth aspect of the present invention, there is provided a process for a continuous production of an ε-caprolactone polymer according to the seventh aspect of the present invention, in which the cooling temperature is 20 to 65° C.

According to a ninth aspect of the present invention, there is provided a process for a continuous production of an ε-caprolactone polymer according to the seventh or eighth aspect of the present invention, in which the heating temperature for the ε-caprolactone polymer in the monomer-removing step is 120 to 300° C.

BEST MODE FOR CARRYING OUT THE INVENTION

Figure 1:
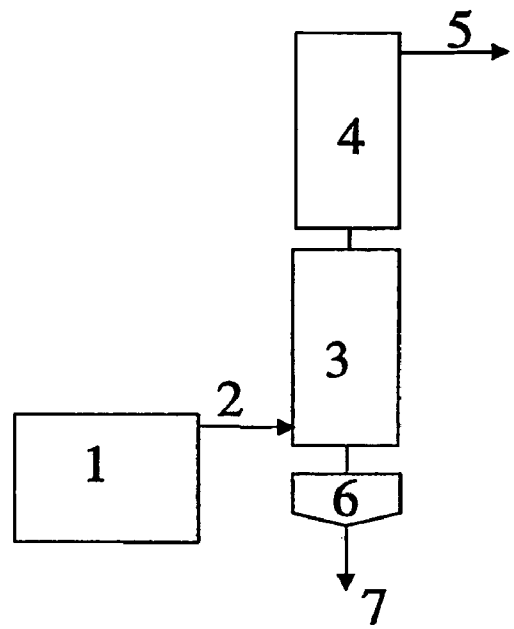
FIG. 1 is a flow sheet showing an embodiment of the process according to the present invention.

Hereinafter, the present invention will be described in detail.

Various ε-caprolactone polymers of the present invention will be described.

The ε-caprolactone polymer is a polymer that can be obtained by ring-opening polymerization of ε-caprolactone using a compound containing an active hydrogen such as an alcohol, amine, or water, an organometallic compound, a metal alkoxide, or the like as an initiator in the absence or presence of a catalyst. The polymer is generally referred to as a polycaprolactone and is not particularly limited as far as it contains unreacted ε-caprolactone.

That is, in the present invention, there may be used cyclic esters or lactams copolymerizable with ε-caprolactone. Examples of the cyclic esters include a cyclic ester of two hydroxycarboxylic acid molecules and a lactone.

The term "lactone" refers to a compound having a cyclic ester structure in its molecule. Specific examples of the lactone include: ε-caprolactone, various methylated caprolactones such as 4-methylcaprolactone, 3,5,5-trimethylcaprolactone, and 3,3,5-trimethylcaprolactone; α,α-dimethyl-β-propiolactone; dodecanolactone; β-propiolactone; butyrolactone; valerolactone; 3-alkylvalerolactone; β,β-dialkylvalerolactone; a lactone of hydroxycyclohexanecarboxylic acid; isocoumarin; coumarin; hydroxycoumarin; and phthalide. Of those, ε-caprolactone is preferably used. ε-Caprolactone is an essential component for the ε-caprolactone polymer in the present invention.

ε-Caprolactone may be subjected to a ring-opening polymerization without other compounds to produce an ε-caprolactone polymer or may be copolymerized with one kind or more of lactones or a cyclic ester of two hydroxycarboxylic acid molecules. In that case, the polymerization ratio of the cyclic ester and the lactone may be changed depending on a target polymer, and various combinations of the cyclic ester and lactone can be selected to provide preferable properties to each other. This process is particularly useful for lowering and regulating the crystallinity of a cyclic ester after polymerization.

The cyclic ester of two hydroxycarboxylic acid molecules is a compound obtained by cyclic esterification of two hydroxycarboxylic acid molecules through intramolecular dehydration. Examples of the cyclic ester include: cyclic esters of two lactic acid, glycolic acid, ethylglycolic acid, and diethylglycolic acid molecules such as diglycolide, dilactide, diethylglycolide, methylglycolide, α,α-dimethylglycolide, trimethylglycolide, and tetramethylglycolide represented by the following general formula (1); dilactides such as L-dilactide and D-dilactide (obtained by cyclic esterification of two L-lactic acid molecules and two D-lactic acid molecules, respectively), D,L-dilactide (obtained by cyclic esterification of two D,L-lactic acid molecules), and MESO-dilactide (obtained by cyclic esterification of one molecule of L-lactic acid and one molecule of D-lactic acid); and cyclic esters of two hydroxy acids molecules such as α-hydroxyacetic acid, α-hydroxyvaleric acid, α-hydroxyisovaleric acid, α-hydroxycaproic acid, α-hydroxyisocaproic acid, α-hydroxy-β-methylvaleric acid, α-hydroxyheptanoic acid, α-hydroxyoctanoic acid, α-hydroxydecanoic acid, α-hydroxymyristic acid, and α-hydroxystearic acid.

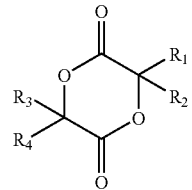

General formula 1

(Wherein $R_1$, $R_2$, $R_3$, and $R_4$ are the same or different from each other, and each represents a hydrogen atom, a methyl group, or an ethyl group.)

In the present invention, cyclic esters to be used together with ε-caprolactone preferably have lower boiling points than that of ε-caprolactone.

The ε-caprolactone polymer in the present invention may be a copolymer obtained by ring-opening polymerization of a polymer having a hydroxyl group and/or an ester bond and ε-caprolactone. Such a copolymer has to be treated at a higher temperature than that employed when generally treating polycaprolactone, so that the influence of depolymerization is often not negligible.

Among the polymers having a hydroxyl group and/or an ester bond which may be used in the present invention, examples of a polymer having a hydroxyl group include a polyvinyl alcohol, a starch, a cellulose, and a cellulose ether. A copolymer of the polymer with ε-caprolactone can easily yield a polymer having akin to a graft polymer, while a copolymer of the polymer and a polyoxyalkylene ether can easily yield a polymer akin to a block polymer.

Meanwhile, examples of a polymer having an ester bond include a polyvinyl acetate, a vinyl acetate-ethylene copolymer, a polyacrylate, a polyacrylate-based copolymer, a polyamide, and a polycarbonate. Examples of a polymer having a hydroxyl group and an ester bond include a cellulose ester and a polyester. Those may be used in combination of two or more. Of those, a crystalline aromatic polyester is particularly preferable. The polymer preferably has a hydroxyl group or a carboxyl group at terminals thereof.

The crystalline aromatic polyester is a crystalline resin which includes: an aromatic dicarboxylic acid mainly selected from the group consisting of phthalic acid, isophthalic acid, terephthalic acid, 2,6-naphthalenedicarboxylic acid, and the like; and one or more aliphatic diols selected from the group consisting of ethylene glycol, propylene glycol, butylene glycol, pentanediol, hexamethylene glycol, octanediol, neopentyl glycol, cyclohexanedimethanol, hydrogenated bisphenol A, xylene glycol, diethylene glycol, triethylene glycol, dipropylene glycol, dibutanediol, a polyalkylene glycol such as polytetramethylene glycol, and the like. In addition, as the dicarboxylic acid component, there may be used an aliphatic dicarboxylic acid selected from the group consisting of succinic acid, adipic acid, azelaic acid, sebacic acid, brassylic acid, cyclohexanedicarboxylic acid, and dimer acid. Specific examples thereof include polyethylene terephthalate, polybutylene terephthalate, polyethylene naphthalate, polybutylene naphthalate, and a polyester-based elastomer that mainly consists of those compounds. The melting points thereof are preferably 170° C. or more.

The ratio of the copolymer components in the reaction depends on required properties of a target ε-caprolactone polymer. For a copolymer of a cyclic ester including ε-caprolactone with a polymer having a hydroxyl group and/or an ester bond, the weight ratio of the cyclic ester/(the polymer having a hydroxyl group and/or an ester bond) is typically 99/1 to 1/99, preferably 5/95 to 75/25, more preferably 10/90 to 60/40.

The ε-caprolactone polymer can be obtained by heating ε-caprolactone singly or in the presence of an initiator and a polymer having a hydroxyl group and/or an ester bond, and mixing and stirring the melt.

Although the temperature in a ring-opening polymerization reaction of ε-caprolactone is optionally set, the temperature is set within the range of 120° C. to 300° C., more preferably 150 to 250° C. When the cyclic ester includes a cyclic ester of two molecules, the temperature is 150° C. to 190° C. When the cyclic ester is composed of only a lactone, the temperature is 180° C. to 250° C. In addition, when using the polymer having a hydroxyl group and/or an ester bond, the temperature is preferably from the 15° C.-lower temperature than the melting point or the softening temperature to the 50° C.-higher temperature than the melting point or the softening temperature, more preferably from the softening temperature or the melting point to the 20° C.-higher temperature than the melting point or the softening temperature. Specifically, the temperature is 150 to 300° C., more preferably 150 to 250° C. In particular, when using the crystalline aromatic polyester, the temperature is 180 to 300° C., more preferably 225 to 260° C.

The ring-opening polymerization reaction of ε-caprolactone with the polymer having a hydroxyl group and/or an ester bond is typically performed under an inert gas or in a reactor filled with polymeric components, i.e., in the reactor substantially having no vapor phase part. Accordingly, the reaction is performed under normal pressure or under applied pressure.

When the cyclic ester is allowed to react with the polymer having a hydroxyl group and/or an ester bond, the reaction ratio of the cyclic ester, in particular, ε-caprolactone may optionally be set. When the reaction ratio is high, the polymerization rate of the cyclic ester drops while a reaction such as transesterification proceeds. Therefore, in particular, when the crystalline aromatic polyester is used as a polymer, the melting point is lowered. The reaction ratio is preferably 75 to 99%, more preferably 90 to 97.5%. The concentration of remaining ε-caprolactone is 0.3 to 10 wt %, more preferably 1 to 5 wt %. Although the reaction time depends on the kinds and ratios of raw materials to be used, the reaction temperature, and the target reaction ratio, the reaction time is generally 0.2 to 20 hours, more preferably 0.5 to 10 hours, and still more preferably 0.5 to 5 hours.

Although such a ring-opening polymerization reaction can be performed in the absence of a catalyst, the reaction may be performed in the presence of a catalyst that may be generally used in a ring-opening polymerization, an esterification reaction, or transesterification. Particularly preferable examples of the catalyst include: metals such as lithium, sodium, potassium, cesium, magnesium, calcium, barium, strontium, zinc, aluminum, titanium, cobalt, germanium, tin, lead, antimony, arsenic, cerium, cadmium, and manganese; organometallic compounds thereof; organic acid salts; alkoxides; and halides. Particularly preferable are organic tin compounds, organic aluminum compounds, and organic titanium compounds, organic tin carboxylates, organic tin halides, tin carboxylates, tin halides, triisobutyl aluminum, aluminum trialkoxylates, tetrabutyl titanate, germanium dioxide, antimony trioxide, or the like. Those catalysts may be used in combination of two or more.

Examples of the ε-caprolactone polymer to be used in the present invention include, depending on the purpose, low-molecular-weight polymers obtained by using: molecular weight adjusters (chain transfer agents) such as water, lactic acid, glycolic acid, and other alcohols, or carboxylic acid; and a compound having, as functional groups, three or more functional groups selected from the group consisting of a carboxyl group, hydroxyl group, and other groups capable of forming esters. Moreover, the ε-caprolactone polymer in the present invention may contain an additive for polymers generally used such as an antioxidant, an ultraviolet absorber, or a plasticizer without particular limitations. Those additives can be used for the ε-caprolactone polymer of the present invention and added to a reaction system in the process of the reaction. During the reaction for producing the ε-caprolactone polymer of the present invention, not only the aforementioned copolymerizable components but also an isocyanate, an acid anhydride, a compound having an epoxy group, or the like may be further additionally added, resulting in modification of the polymer properties.

The ring-opening polymerization reaction of the cyclic ester with the polymer having a hydroxyl group and/or an ester bond is performed using a batch or continuous reactor. In the case of the batch reactor, the reaction ratio of the cyclic ester including ε-caprolactone changes as time elapses while collecting a resin, which causes a change in the amount of unreacted ε-caprolactone in the ε-caprolactone polymer to be treated thereafter in accordance with the process of the present invention. Thus, the continuous reactor is preferably used. Meanwhile, in the case of continuous polymerization of a resin, stable hues, molecular weights, and melting points can be attained in respective lots by making the heating time, the heating temperature, and the like.

Although the molecular weight of the ε-caprolactone polymer thus obtained depends on the component ratio of raw materials, the weight average molecular weight is 1,000 to 500,000, more preferably 10,000 to 300,000.

The thus-obtained ε-caprolactone polymer contains unreacted ε-caprolactone and other volatile impurities. It is difficult to reduce the amount of ε-caprolactone through the ring-opening polymerization reaction to the level where essentially no ε-caprolactone is present. Typically, the ring-opening polymerization reaction proceeds in proportion to the concentration of remaining ε-caprolactone, so that the decreasing rate of ε-caprolactone is extremely small at the end of the reaction. ε-Caprolactone is liable to regenerate by depolymerization reaction at the terminals of polycaprolactone obtained by polymerization, which is considered to be another reason why it is difficult to reduce the concentration of ε-caprolactone. At the same time, a similar reaction or thermal decomposition reaction probably generates a plurality of volatile components, which also causes problems such as bleed out in a melt processing. Therefore, the volatile components should be removed together with ε-caprolactone.

The operations according to the present invention may be performed using melted or solid ε-caprolactone polymer. Therefore, the melting point of an ε-caprolactone polymer obtained by using ε-caprolactone and a polymer having a hydroxyl group and/or an ester bond is, although not particularly specified, preferably 150° C. or more. In addition, when the melting point is 170° C. or more, the effect by the present invention becomes more remarkable. On the other hand, the melting point is 300° C. or less, more preferably 250° C. or less. A treatment at a high temperature generates many volatile components such as ε-caprolactone, so that the load on a collecting machine increases and the effect by the present invention becomes accordingly more remarkable.

The temperature for treating the ε-caprolactone polymer is preferably 120 to 300° C., more preferably 170 to 250° C. When the temperature is lower than the aforementioned temperatures, the volatile components such as ε-caprolactone can be removed only slowly and cannot be removed sufficiently. Meanwhile, when the temperature is higher than the aforementioned temperatures, the physical properties of the resin change during the treatment, so that it becomes difficult to stably maintain the physical properties of the resultant resin and the hue or the like particularly deteriorates by thermal decomposition or the like.

In the present invention, the pressure for treating the ε-caprolactone polymer is within the range of normal pressure to a reduced pressure. In the case of normal pressure, the reaction is performed by continuously bringing an inert gas such as nitrogen, helium, or argon into contact with the ε-caprolactone polymer under heating. Meanwhile, when the pressure is to be maintained at a reduced pressure, the pressure is 50 torr or lower, more preferably 100 torr or lower, still more preferably 1 torr or lower. An additional inert gas may be supplied while reducing the pressure. The amount of the inert gas to be supplied is optionally set while checking the removal efficiency of the volatile components and treatment time. The inert gas is preferably heated in advance to approximately a desired treatment temperature.

It is preferable that the apparatus to be used for the production in the present invention can heat and maintain the ε-caprolactone polymer and be designed so as to maintain the entire apparatus uniformly. The apparatus may be a reactor-type apparatus that has a stirring blade or an apparatus that vibrates and rotates itself for stirring. Moreover, the apparatus may be an apparatus having a cylindrical or column form, and preferable is an apparatus having two or more stirring axes. Such an apparatus is preferably used for a continuous treatment. In addition, in the case of treating solid ε-caprolactone polymer, even when using an apparatus that has a column form and does not positively stir pellets, it suffices that the apparatus be designed so as to supply a gas uniformly, and further the apparatus may be a cascade-type dryer. The apparatus is desirably designed so as to have a heat insulator or the like for increasing the temperature of the ε-caprolactone polymer sufficiently. In addition, the apparatus may be provided with a jacket or the like for heating the polymer to a temperature similar to that of the gas by steam, a heating medium, or the like. Each of the above-mentioned apparatuses includes a vapor phase part having at least one outlet for collecting volatile components.

Although the treatment time or retention time in the present invention varies depending on the treatment temperature of an ε-caprolactone polymer, stirring state, initial ε-caprolactone concentration, targeted concentration, or the like, the time is generally 2 minutes to 10 hours, more preferably 5 minutes to 2 hours. The time is selected in combination with the treatment temperature or the like considering the effect on a resin as well as the economical efficiency.

The present invention essentially requires a step for collecting, from the vapor phase part, a volatile component by operations of cooling, condensation, exhaust of a condensate. In the case of a treatment under reduced pressure, such a step is performed between a melt apparatus used under heating and an exhaust apparatus provided to maintain the temperature at a reduced pressure. On the other hand, in the case of a treatment under normal pressure, the step is performed so as to connect to an exhaust port of a treatment apparatus via a piping or the like.

It is to be noted that the ε-caprolactone polymer may be treated batchwise or may be treated continuously or intermittently. The term "continuous" in the present invention essentially refers to a case excluding a process in which the piping or apparatus used for recovering a volatile component is closed or stopped, followed by regeneration or washing. However, for example, it includes a case where a recovering apparatus connected to the same batch-type treatment apparatus is used intermittently. In particular, when the treatment of the ε-caprolactone polymer itself accompanies supply or exhaust of the ε-caprolactone polymer, washing is difficultly performed and the effect by the present invention is exhibited more remarkably.

The term "recovering apparatus" refers to an apparatus capable of performing cooling, condensation, and exhaust of condensates. That is, the apparatus is designed so as to have a large contact area with the vapor phase part for maintaining the temperature at a constant temperature and cooling the vapor phase part more efficiently, and can exhaust a condensed component after the component is transferred through the surface of the apparatus or the cavity portion of the apparatus and then collected at a certain portion. Such an apparatus is typically used in combination with a heat exchanger, an apparatus called condenser, an apparatus such as a distillation column, a tank, and a pump for exhaust.

The aforementioned cooling and recovery of ε-caprolactone enable not only to prevent environmental problems but also to purify and use again ε-caprolactone, resulting in economical merits. However, when such operations are continuously performed for a long period of time, it is confirmed that deposited products clog the piping or inside the apparatus, which substantially causes difficulty in continuous operations because of lowering of the degree of the pressure reduction or difficulty in gas supply. The results of an analysis revealed that most of the deposited products are caprolactone dimer. The caprolactone dimer is a cyclic dimer formed of two ε-caprolactone molecules.

The present invention is performed as limiting the weight ratio of ε-caprolactone to be collected to ε-caprolactone dimer. The term "to be collected" refers to "to be drawn by the cooling and recovery operations" from the cooling and recovering apparatus by condensing ε-caprolactone and ε-caprolactone dimer in the vapor phase part before cooling. A term "amount to be collected" refers to an amount that equals A minus B (A is the amount of ε-caprolactone and ε-caprolactone dimer in the vapor phase part before cooling, and B is the amount of ε-caprolactone and ε-caprolactone dimer that fail to condense by cooling and recovery operations). In the present invention, the weight ratio of ε-caprolactone relative to ε-caprolactone dimer is five-fold or more, preferably 10-fold or more. When the weight ratio is low, continuous operations are difficult to perform due to the influence of deposited products such as caprolactone dimer as described above.

There are various factors to vary the weight ratio of ε-caprolactone to be collected to ε-caprolactone dimer. For example, in a polymerization step, the amount of ε-caprolactone gradually decreases during the reaction, whereas the amount of caprolactone dimer gradually tends to increase. The weight ratio of the two components can be effectively regulated by regulating polymerization conditions such as the reaction time, reaction ratio, presence or absence of a catalyst, catalyst type, and catalyst amount. Accordingly, the step is affected by the reaction temperature, catalyst type, catalyst amount, hydroxyl group amount, ε-caprolactone amount to be used, or the like. However, in the case of a batch treatment, it is difficult to constantly maintain the reaction ratio or the like because time for performing respective steps is different from each other. Moreover, even in an operation for removing unreacted ε-caprolactone and ε-caprolactone dimer under reduced pressure, a depolymerization reaction in which those are generated gradually proceeds, and further the amount to be actually removed or recovered varies depending on conditions.

In the present invention, the temperature in the recovering operation is maintained at two or more different temperatures. Therefore, two or more recovering apparatus may be used in combination, or the portion to be heated in the same apparatus is divided into two or more and the two or more different temperatures may be set independently.

In the present invention, the volatile components to be exhausted through the vapor phase part are initially supplied to the recovering apparatus maintained at 20 to 65° C., preferably 30 to 50° C. If the temperature is lower than the aforementioned temperatures, the effect by the present invention cannot be exerted because caprolactone dimer is deposited. In contrast, if the temperature is higher than that, the effect as a recovering apparatus decreases, so that the recovery of the volatile components substantially depends on only the subsequent recovering operation at low temperature, resulting in more loss. If necessary, the volatile components to be exhausted through the vapor phase part is supplied to the recovering apparatus that is set at −2 to 30° C., preferably 0 to 20° C. If the temperature is higher, the ability as a recovering apparatus is lowered and the concentration of ε-caprolactone remaining in the vapor phase increases, which causes an adverse effect on environment or an adverse effect on an instrument such as a vacuum pump. In contrast, if the temperature is lower, ε-caprolactone is crystallized, so that the recovering operation becomes difficult to perform.

The size or the like of the apparatus may optionally be set. Although the conditions vary depending on the amount of the volatile components, the degree of the pressure reduction, or the form of the apparatus, they are desirably set in consideration of the concentration of the volatile components in a gas to be exhausted.

In the present invention, in addition to the aforementioned recovering apparatus, there may be further installed a recovering apparatus maintained at −2° C. or less or an adsorption apparatus filled with an adsorbent. Such an apparatus has a difficulty in exhausting components to be adsorbed or ε-caprolactone. Accordingly, if necessary, two or more apparatuses are arranged in parallel to perform operations for heating and regeneration alternately.

Hereinafter, one embodiment of the present invention is described by way of a drawing. FIG. 1 is a flow sheet showing an embodiment of the process of the present invention.

Firstly, a treatment apparatus 1 is a batch-type apparatus for treating an ε-caprolactone polymer under reduced pressure or in an inert gas stream. Volatile components containing ε-caprolactone are led to a recovering apparatus 3 through a piping 2. In order to prevent deposition of the volatile components, the temperature of the piping 2 is set similar to that of the treatment apparatus 1, and it is preferably maintained at a temperature equal to 115° C. or more. The recovering apparatus 3 are maintained at 30 to 65° C. Subsequently, the volatile components are led to a recovering apparatus 4. The recovering apparatus 4 is maintained at −2 to 30° C. A piping 5 provided at an upper portion of the recovering apparatus 4 is, in some cases, connected to a recovering apparatus or adsorption column that is set to a lower temperature, and is subsequently connected to an apparatus for exhausting an inert gas or for reducing the pressure such as a vacuum pump. The volatile components condensed by the recovering apparatuses 3 and 4 are exhausted from an outlet 7 by a valve, pump, and the like that are provided at the bottom portion after being stored or not stored in a tank 6. In such an apparatus, the ε-caprolactone polymer treated in the treatment apparatus 1 is collected, and untreated ε-caprolactone polymer to be treated in the next batch is treated without washing the recovering apparatus.

Figure 2:
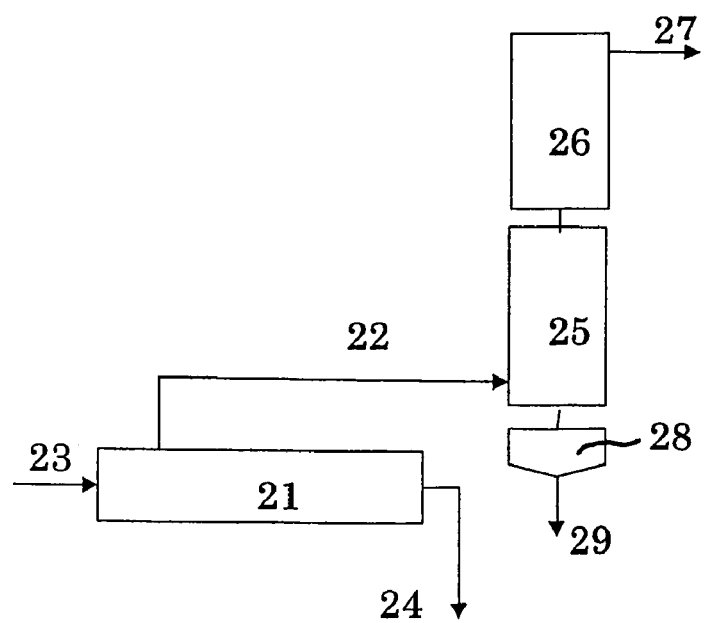
FIG. 2 is a flow sheet showing an embodiment of the present invention in the case where the process according to the present invention including a ring-opening polymerization is continuously performed.

An embodiment of the present invention in which the process of the present invention including the ring-opening polymerization is performed continuously will be described by way of a drawing. FIG. 2 is a flow sheet showing an embodiment of the present invention.

An ε-caprolactone polymer is continuously supplied via a polymer supply port 23 that is connected to a continuous treatment apparatus 21, and treated under reduced pressure or in an inert gas stream. The treated polymer is also continuously exhausted via a resin outlet 24. Volatile components are led to recovering apparatuses 25 and 26 via a piping 22 that is connected to the vapor phase part. The recovering apparatus 25 is maintained at 30 to 65° C., whereas the recovering apparatus 26 is maintained at −2 to 30° C. A piping 27 provided at an upper portion of the recovering apparatus 26 is, in some cases, connected to a recovering apparatus or adsorption column that is set to a lower temperature, and is subsequently connected to an apparatus such as a vacuum pump for exhausting an inert gas or for reducing the pressure. The volatile components condensed by the recovering apparatuses 25 and 26 are exhausted via an outlet 29 by a valve, pump, and the like that are provided at the bottom portion, after being stored or not stored in a tank 28.

The effect by the present invention can be more preferably exhibited when the polymerization of ε-caprolactone is further performed continuously. The continuous polymerization may stabilize the amount of ε-caprolactone and caprolactone dimer as volatile components, resulting in stabilization of the continuous operation of the recovering apparatus. When performing such an operation, it is practically difficult to stop only the recovering apparatus. When the operation is performed according to a process except that of the present invention, it is required that two or more recovering apparatuses are arranged in parallel and the apparatuses are used alternately at a constant interval for regeneration.

EXAMPLES

Hereinafter, the present invention will be described in detail by way of examples and comparative examples but the present invention is not limited thereto.

It is to be noted that unless otherwise specified, the terms "%" and "part" represent "% by weight" and "part by weight", respectively.

(ε-Caprolactone Concentration and Caprolactone Dimer Concentration)

The measurement was performed by GC-14A (manufactured by Shimadzu Corporation) using a glass-made column (internal diameter: 3.2 mm, length: 2.1 m) filled with PEG20M 10% /Uniport HPS. A sample (0.5 g) and diphenyl ether (0.1 g) serving as an internal standard substance were precisely weighed and dissolved in 20 g of hexafluoroisopropanol (HFIP). After a mixture was maintained at constant temperature of 180° C. for 8 minutes, the temperature was allowed to increase gradually up to 220° C. and maintained stably at 220° C. The ε-caprolactone concentration and caprolactone dimer concentration were calculated from the result of the measurement performed using nitrogen as a carrier based on the internal standard method.

Example 1

The condenser 3 maintained at 30° C. and the condenser 4 maintained at 5° C. were connected to the bottom portion of a recovering apparatus that was arranged in series so that the condenser 3 was arranged under the condenser 4 via a valve connected to an upper portion of a 50-liter reactor having a stirrer. In order to prevent condensation of volatile components, a piping connecting the reactor and the recovering apparatus was heated and the temperature thereof was maintained. The bottom portion of the condenser 3 had a piping for providing a vapor phase part from the reactor and the flask 6 for storing a condensed component temporarily. The reduced pressure was maintained by an oil diffusion pump connected to an upper portion of the condenser 4 via a cold trap that was set at −30° C.

A ring-opening polymerization reaction was performed by heating and stirring 12 kg of a polybutylene terephthalate and 8 kg of ε-caprolactone in a reaction vessel at 230° C. for 1 hour. Subsequently, the pressure within the vessel was gradually reduced and maintained at 1 torr for 1 hour. Then, the pressure was returned to the normal temperature to collect only components in the flask 6. Part of the components in the flask had solid matters but the components were uniformly dissolved by heating to 30° C., so that there was no problem in handling.

Hardly any condensed components were observed in an inside of the cold trap. A small amount solid matters were deposited in the inside piping of the condenser 3.

Although the aforementioned batch operation was continuously repeated 10 times without washing out solid matters deposited in the recovering apparatus, the operation for reducing the pressure could be performed without any trouble. During the operation, the amount of the solid matters in the piping of the condenser 3 varied, i.e. increased and decreased, a low level to a high level but there was no problem for the operation.

After the batch operation was repeated 10 times, the inside of the condenser was washed, and the ε-caprolactone concentration and caprolactone dimer concentration were determined for all of the condensed components. As a result, the ratio of ε-caprolactone relative to caprolactone dimer was 5.3 (by weight). The concentration of ε-caprolactone in a copolymer obtained after the treatment was 510 to 620 ppm and the concentration of caprolactone dimer was 480 to 650 ppm.

Example 2

The examination was performed in a manner similar to that in Example 1 except that 11.5 kg of the polybutylene terephthalate and 8.5 kg of ε-caprolactone were used.

Hardly any condensed components were observed in the inside of the cold trap. Hardly any solid matters were deposited in the inside piping of the condenser 3.

Although the aforementioned batch operation was continuously repeated 10 times without washing out solid matters deposited in the recovering apparatus, the operation for reducing the pressure could be performed without any trouble.

After the batch operation was repeated 10 times, the inside of the condenser was washed, and the ε-caprolactone concentration and caprolactone dimer concentration were determined for all of the condensed components. As a result, the ratio of ε-caprolactone relative to caprolactone dimer was 10.2 (by weight). The concentration of ε-caprolactone in a copolymer obtained after the treatment was 470 to 580 ppm and the concentration of caprolactone dimer was 430 to 560 ppm.

Comparative Example 1

The examination was performed in a manner similar to that in Example 1 except that 2 g of tetrabutyl titanate was further used in addition to the polybutylene terephthalate and ε-caprolactone.

Hardly any condensed components were observed in the inside of the cold trap. A small amount of solid matters were deposited in the inside piping of the condenser 3, particularly in the lower part.

Although the aforementioned batch operation was continuously repeated 5 times without washing out solid matters deposited in the recovering apparatus, the degree of the pressure reduction became unstable in the 5th batch. From the observation of the inside of the condenser, it was confirmed that deposited solid matters clogged almost all portions.

After the batch operation was repeated 5 times, the inside of the condenser was washed, and the ε-caprolactone concentration and caprolactone dimer concentration were determined for all of the condensed components. As a result, the ratio of ε-caprolactone relative to caprolactone dimer was 2.8 (by weight). The concentration of ε-caprolactone in a copolymer obtained after the treatment of the 5th batch was 680 ppm and the concentration of caprolactone dimer was 750 ppm.

Example 3

The examination was performed in a manner similar to that in Example 1 except that the condenser 3 was maintained at 40° C.

Solid matters were deposited at a part of the wall of the flask, but there was no problem in the operation.

Hardly any condensed components were observed in the inside of the cold trap. Hardly any solid matters were deposited in the inside piping of the condenser 3.

Although the aforementioned batch operation was continuously repeated 10 times without washing out solid matters deposited in the recovering apparatus, the operation for reducing the pressure was able to be performed without any trouble.

After the batch operation was repeated 10 times, the inside of the condenser was washed, and the ε-caprolactone concentration and caprolactone dimer concentration were determined for each of the all condensed components. As a result, the ratio of ε-caprolactone relative to caprolactone dimer was 5.2 (by weight).

Example 4

The examination was performed in a manner similar to that in Example 1 except that the condenser 3 was maintained at 60° C.

Condensed components in the flask were completely uniform and solid matters were not observed, so that there was no problem in the operation.

Hardly any condensed components were observed in the inside of the cold trap. Hardly any solid matters were deposited in the inside piping of the condenser 3.

Although the aforementioned batch operation was continuously repeated 10 times without washing out solid matters deposited in the recovering apparatus, the operation for reducing the pressure was able to be performed without any trouble.

After the batch operation was repeated 10 times, the inside of the condenser was washed, and the ε-caproiactone concentration and caprolactone dimer concentration were determined for each of the all condensed components. As a result, the ratio of ε-caprolactone relative to caprolactone dimer was 5.3 (by weight)

Comparative Example 2

The examination was performed in a manner similar to that in Example 1 except that the condenser 3 was maintained at 70° C. However, a phenomenon that the degree of the pressure reduction decreases was sometimes observed, suggesting a problem in stability.

Condensed components in the flask were completely uniform and solid matters were not observed, so that there was no problem in the operation.

Hardly any condensed components were observed in the inside of the cold trap. Hardly any solid matters were deposited in the inside piping of the condenser 3.

Although the aforementioned batch operation was continuously repeated 10 times without washing out solid matters deposited in the recovering apparatus, the operation for reducing the pressure was able to be performed without any trouble.

After the batch operation was repeated 10 times, the inside of the condenser was washed, and the ε-caprolactone concentration and caprolactone dimer concentration were determined for each of the all condensed components. As a result, the ratio of ε-caprolactone relative to caprolactone dimer was 5.0 (by weight)

Example 5

A polybutylene terephthalate was supplied to a twin-screw extruder (inner diameter: 30 mm, L/D=42) and ε-caprolactone was further supplied thereto via a vent port. The polybutylene terephthalate was previously dried. The entire twin-screw extruder was set to 240° C. After the polybutylene terephthalate was melted, ε-caprolactone was mixed therewith to cause the ring-opening polymerization. The extruder was connected to a continuous kneader (KRC-S2V, manufactured by Kurimoto, Ltd.) set at the temperature of 230° C. via the piping 23. An upper portion of the KRC was connected to the condenser 25, condenser 26, flask 28, a cold trap, and a vacuum pump via the piping 22 in a manner similar to that in Example 1. The flask 28 had a jacket so as to maintain the temperature after heating, and the upper and lower portions of the flask had a valve so as to draw condensed components by operating the valve even under reduced pressure. A resin obtained by a treatment under reduced pressure was continuously collected from the KRC, and the collected resin was cooled and cut into a pellet form.

Polybutylene terephthalate and ε-caprolactone were supplied at 3 kg/Hr and at 2 kg/Hr, respectively. The twin-screw extruder stirred the mixture at 100 rpm, and KRC was operated at 50 rpm. The degree of the pressure reduction was maintained at 1 torr. The condenser 25 and flask 28 were maintained at 40° C., and the condenser 26 was maintained at 5° C.

Even when the polymerization and treatment operations were continuously performed for 60 hours after the start of the operations, hardly any solid matters were deposited inside the condenser 25, so that the operations was able to be performed stably.

After 60 hours, the inside of the condenser was washed, and the ε-caprolactone concentration and caprolactone dimer concentration were determined for each of the all condensed components. As a result, the ratio of ε-caprolactone relative to caprolactone dimer was 5.7 (by weight). The concentration of ε-caprolactone in a copolymer, which was measured by sampling every 5 hours, was 460 to 500 ppm and the concentration of caprolactone dimer was 400 to 480 ppm, which were confirmed to be stable.

Comparative Example 3

The examination was performed in a manner similar to that in Example 5 except that the polybutylene terephthalate and ε-caprolactone were supplied at 2.4 kg/Hr and at 1.6 kg/Hr, respectively. Both the time for the polymerization and the time for the treatment under reduced pressure were maintained long by reduction in the resin amount.

After 12 hours from the start of the operation, many solid matters were deposited inside the condenser 25, and solid matters were also deposited inside the flask 28 in a slurry form.

After 18 hours from the start of the operation, the pressure became unstable and the apparatus was no longer able to maintain the degree of the pressure reduction at 1 torr, so that the operation was stopped.

After stopping the operation, the inside of the condenser was washed, and the ε-caprolactone concentration and caprolactone dimer concentration were determined for each of the all condensed components. As a result, the ratio of ε-caprolactone relative to caprolactone dimer was 4.3 (by weight).

INDUSTRIAL APPLICABILITY

The present invention enables the continuous operation for removing and recovering unreacted ε-caprolactone from an ε-caprolactone polymer. For example, the operation can effectively produce a polyester elastomer that has excellent heat resistance, hydrolysis resistance, and weatherability without deteriorating the physical properties.

The invention claimed is:

1. A process for a continuous production of an ε-caprolactone polymer, which comprises:
   heating an ε-caprolactone polymer under reduced pressure or in an inert gas stream to volatilize unreacted ε-caprolactone from the polymer; and
   cooling a vapor phase part containing a matter volatilized to thereby recover the unreacted ε-caprolactone,
   wherein the amount of ε-caprolactone to be recovered is regulated to larger than 5 times by weight relative to the amount of caprolactone dimer, and
   wherein the ε-caprolactone polymer is a copolymer of a polymer having a hydroxyl group and/or an ester bond and ε-caprolactone.

2. A process for a continuous production of an ε-caprolactone polymer according to claim 1, wherein the amount of ε-caprolactone to be recovered is regulated to equal to or larger than 10 times by weight relative to the amount of caprolactone dimer.

3. A process for a continuous production of an ε-caprolactone polymer according to claim 1 or 2, wherein the step of cooling the vapor phase part to recover unreacted ε-caprolactone includes a recovering step in which the temperature is regulated within 20 to 65° C. and an optional recovering step in which the temperature is regulated within −2 to 30° C.

4. A process for a continuous production of an ε-caprolactone polymer according to claim 1, wherein the polymer having a hydroxyl group and/or an ester bond is a polyester.

5. A process for a continuous production of an ε-caprolactone polymer according to claim 1, which further comprises a ring-opening polymerization step of ε-caprolactone as a preceding step.

6. A process for a continuous production of an ε-caprolactone polymer, which comprises:
   a polymerization step for performing a ring-opening polymerization of ε-caprolactone singly or with a polymer having a hydroxyl group and/or an ester bond;
   a monomer-removing step which includes heating an ε-caprolactone polymer under reduced pressure or in an inert gas stream in a treatment apparatus (1) to volatilize a matter to be volatilized containing ε-caprolactone and caprolactone dimer from the polymer; and
   a recovering step which includes cooling a vapor phase part containing a matter volatilized in a recovering apparatus (3) to recover ε-caprolactone as a liquid, wherein:
   (i) the cooling temperature is regulated;
   (ii) the polymerization condition is regulated; and/or
   (iii) ε-caprolactone is added to the treatment apparatus (1) and/or the recovering apparatus (3)
   so that the amount of ε-caprolactone to be recovered is regulated to larger than 5 times by weight relative to the amount of caprolactone dimer to prevent clogging in the recovering step.

7. A process for a continuous production of an ε-caprolactone polymer according to claim 6, wherein the cooling temperature is 20 to 65° C.

8. A process for a continuous production of an ε-caprolactone polymer according to claim 6 or 7, wherein the heating temperature for the ε-caprolactone polymer in the monomer-removing step is 120 to 300° C.

* * * * *